US009400633B2

(12) United States Patent
Reich et al.

(10) Patent No.: US 9,400,633 B2
(45) Date of Patent: Jul. 26, 2016

(54) METHODS AND APPARATUS FOR VOICED-ENABLING A WEB APPLICATION

(75) Inventors: David E. Reich, Jupiter, FL (US); Christopher Hardy, Incline Village, NV (US)

(73) Assignee: Nuance Communications, Inc., Burlington, MA (US)

( * ) Notice: Subject to any disclaimer, the term of this patent is extended or adjusted under 35 U.S.C. 154(b) by 525 days.

(21) Appl. No.: 13/565,256

(22) Filed: Aug. 2, 2012

(65) Prior Publication Data

US 2014/0040722 A1 Feb. 6, 2014

(51) Int. Cl.
*G06F 17/00* (2006.01)
*G06F 3/16* (2006.01)
*G10L 15/22* (2006.01)

(52) U.S. Cl.
CPC ................ *G06F 3/167* (2013.01); *G06F 17/00* (2013.01); *G10L 15/22* (2013.01); *G10L 2015/228* (2013.01)

(58) Field of Classification Search
CPC ............ G06F 17/2247; G06F 9/45508; G06F 17/2705
USPC ........................................... 715/234; 704/275
See application file for complete search history.

(56) References Cited

U.S. PATENT DOCUMENTS 5,893,063 A 4/1999 Loats et al.
5,915,001 A 6/1999 Uppaluru
5,960,399 A 9/1999 Barclay et al.
6,092,043 A 7/2000 Squires et al.
6,101,472 A 8/2000 Giangarra et al.
6,529,863 B1 3/2003 Ball et al.
6,578,000 B1 6/2003 Dodrill et al.
6,604,075 B1 * 8/2003 Brown ................ H04M 3/4938 704/270.1
6,604,076 B1 * 8/2003 Holley .............. G06F 17/30899 704/235
6,766,298 B1 * 7/2004 Dodrill ............... H04M 3/4938 704/235
6,952,800 B1 * 10/2005 Danner ................... G10L 15/26 704/E15.045
7,028,306 B2 4/2006 Boloker et al.
7,167,831 B2 1/2007 Falcon et al.
7,869,998 B1 1/2011 Di Fabbrizio et al.
7,899,673 B2 3/2011 Brown
8,060,371 B1 11/2011 Schaedler et al.
8,352,277 B2 1/2013 Bennett
8,560,324 B2 * 10/2013 Shin ........................ G06F 3/167 704/231
8,694,537 B2 * 4/2014 Mohajer ........... G06F 17/30684 704/235
8,768,711 B2 7/2014 Ativanichayaphong et al.
8,788,271 B2 * 7/2014 James ................... G06F 9/4443 704/270
8,949,266 B2 2/2015 Phillips et al.
9,292,252 B2 * 3/2016 Hardy ............... G06F 17/30873
9,292,253 B2 * 3/2016 Reich ...................... G06F 3/167

(Continued)

FOREIGN PATENT DOCUMENTS

IE WO 2007004069 A2 * 1/2007 ........ G06F 17/30899

*Primary Examiner* — Scott Baderman
*Assistant Examiner* — Mario M Velez-Lopez
(74) *Attorney, Agent, or Firm* — Wolf, Greenfield & Sacks, P.C.

(57) ABSTRACT

Methods and apparatus for voice-enabling a web application, wherein the web application includes one or more web pages rendered by a web browser on a computer. At least one information source external to the web application is queried to determine whether information describing a set of one or more supported voice interactions for the web application is available, and in response to determining that the information is available, the information is retrieved from the at least one information source. Voice input for the web application is then enabled based on the retrieved information.

11 Claims, 8 Drawing Sheets

(56) References Cited

U.S. PATENT DOCUMENTS

2001/0054085 A1 12/2001 Kurganov
2002/0062216 A1* 5/2002 Guenther ................ G06F 3/167 704/270.1
2002/0178003 A1* 11/2002 Gehrke ................... G10L 15/30 704/246
2003/0014251 A1* 1/2003 Pokhariyal .............. G10L 15/26 704/251
2003/0083881 A1* 5/2003 Liu ......................... G10L 13/00 704/270.1
2003/0144846 A1* 7/2003 Denenberg .................... 704/277
2004/0006471 A1* 1/2004 Chiu ................... H04M 3/4938 704/260
2004/0010412 A1* 1/2004 Chiu ................... H04M 3/4938 704/270.1
2004/0138890 A1* 7/2004 Ferrans ............. H04M 1/72561 704/270.1
2004/0141597 A1* 7/2004 Giacomelli ......... H04M 3/4938 379/88.17
2004/0153323 A1* 8/2004 Charney ................ G10L 15/193 704/270.1
2004/0225499 A1 11/2004 Wang et al.
2004/0230637 A1 11/2004 Lecoueche et al.
2005/0022116 A1* 1/2005 Bowman ........... G06F 17/30896 715/234
2005/0043952 A1 2/2005 Sharma et al.
2005/0131701 A1 6/2005 Cross et al.
2005/0135383 A1 6/2005 Shenefiel
2005/0143975 A1 6/2005 Charney
2005/0193332 A1* 9/2005 Dodrill ................... H04L 29/06 715/234
2005/0203747 A1* 9/2005 Lecoeuche ........ G06F 17/30731 704/270.1
2005/0240620 A1 10/2005 Danner et al.
2006/0069568 A1* 3/2006 Passaretti ................ G10L 15/01 704/270
2006/0136221 A1* 6/2006 James ................... G06F 9/4443 704/275
2006/0206591 A1 9/2006 Lucas et al.
2006/0235699 A1* 10/2006 Dhanakshirur ......... G10L 15/22 704/275
2007/0027692 A1* 2/2007 Sharma .................. A61K 8/411 704/270.1
2007/0185717 A1* 8/2007 Bennett ............... G06F 17/2775 704/270.1
2007/0213980 A1* 9/2007 Danner .................. G06Q 20/16 704/231
2008/0059195 A1* 3/2008 Brown .......................... 704/270
2008/0065387 A1* 3/2008 Cross, Jr. ................ G10L 15/22 704/270
2008/0065737 A1* 3/2008 Burke ............... G06F 17/30035 709/217
2008/0140410 A1* 6/2008 Ativanichayaphong G06F 17/30896 704/270
2008/0215331 A1 9/2008 Cross et al.
2008/0255851 A1 10/2008 Ativanichayaphong et al.
2008/0276163 A1 11/2008 Takagi et al.
2008/0301540 A1* 12/2008 Sava ..................... G06F 17/211 715/205
2008/0312922 A1* 12/2008 Evenden ........... H04L 29/06027 704/246
2009/0216533 A1* 8/2009 Leite ..................... G10L 15/063 704/251
2009/0254346 A1* 10/2009 Moore .................. G10L 15/265 704/260
2009/0254348 A1* 10/2009 Moore .................. G06F 17/243 704/260
2009/0299745 A1 12/2009 Kennewick et al.
2010/0031151 A1 2/2010 Cross et al.
2010/0036663 A1* 2/2010 Rangarao .............. H04L 1/0021 704/240
2010/0036665 A1* 2/2010 Bess ......................... G06F 8/38 704/251
2010/0058220 A1* 3/2010 Carpenter .............. G06Q 30/02 715/772
2010/0094635 A1* 4/2010 Bermudez Perez ................ G06F 17/30861 704/270.1
2010/0151889 A1 6/2010 Chen et al.
2010/0162101 A1 6/2010 Anisimov et al.
2010/0185448 A1 7/2010 Meisel
2010/0191619 A1 7/2010 Dicker et al.
2010/0293446 A1 11/2010 Lucas et al.
2010/0312547 A1 12/2010 Van Os et al.
2011/0010180 A1 1/2011 Agapi et al.
2011/0044438 A1 2/2011 Wang et al.
2011/0091023 A1 4/2011 Kurganov et al.
2011/0106537 A1 5/2011 Funyak et al.
2011/0202344 A1 8/2011 Meyer et al.
2011/0301943 A1 12/2011 Patch
2012/0011443 A1 1/2012 Cross et al.
2012/0053930 A1 3/2012 Bangalore et al.
2012/0084639 A1* 4/2012 Dodrill ................... H04L 67/34 715/234
2012/0130718 A1* 5/2012 Dhanakshirur ... H04M 3/42144 704/260
2012/0253801 A1* 10/2012 Santos-Lang ........... G10L 15/22 704/235
2013/0185643 A1* 7/2013 Greifeneder ............ H04L 67/22 715/736
2013/0246041 A1* 9/2013 Costa .................... G06F 17/289 704/2
2013/0283172 A1 10/2013 Cross, Jr. et al.
2013/0297318 A1 11/2013 Balasubramanyam et al.
2014/0039885 A1 2/2014 Reich et al.
2014/0039898 A1 2/2014 Reich et al.
2014/0040745 A1 2/2014 Reich et al.
2014/0040746 A1 2/2014 Reich et al.
2014/0207462 A1 7/2014 Bangalore et al.
2014/0244259 A1 8/2014 Rosario et al.

* cited by examiner

METHODS AND APPARATUS FOR VOICED-ENABLING A WEB APPLICATION

BACKGROUND

Many computer applications are made available for use or access over the Internet. Such web applications typically execute, at least in part, on a client computer and are rendered in a web browser of the client computer, with program logic being executed by some combination of the web browser and one or more web servers hosting the application. Web applications typically use application logic coded in a browser-supported language (e.g., JavaScript) combined with a browser-rendered markup language (e.g., HTML). More recent developments in web application design have been directed at providing web applications using technologies such as AJAX, which allow for increased user interactivity without having to reload entire web page for the web application each time a user interacts with the web page. Such dynamic updates to web pages enables faster operation of a web application by reducing the amount of data transfer and rendering required in response to user interactions.

SUMMARY

Some embodiments are directed to a method of voice-enabling a web application, wherein the web application includes one or more web pages rendered by a web browser, the method comprising: querying at least one information source external to the web application to determine whether information describing a set of one or more supported voice interactions for the web application is available, wherein the at least one information source includes voice interaction information for a plurality of web applications; retrieving from the at least one information source, in response to determining that the information describing a set of one or more supported voice interactions for the web application is available, the information describing the set of supported voice interactions for the web application; and enabling voice input for the web application based on the retrieved information specifying the set of one or more supported voice interactions.

Some embodiments are directed to a computer-readable storage medium encoded with a plurality of instructions that, when executed by a computer, perform a method comprising: querying at least one information source external to the web application to determine whether information describing a set of one or more supported voice interactions for the web application is available, wherein the at least one information source includes voice interaction information for a plurality of web applications; retrieving from the at least one information source, in response to determining that the information describing a set of one or more supported voice interactions for the web application is available, the information describing the set of supported voice interactions for the web application; and enabling voice input for the web application based on the retrieved information specifying the set of one or more supported voice interactions.

Some embodiments are directed to a computer comprising: at least one processor programmed to: query at least one information source external to the web application to determine whether information describing a set of one or more supported voice interactions for the web application is available, wherein the at least one information source includes voice interaction information for a plurality of web applications; retrieve from the at least one information source, in response to determining that the information describing a set of one or more supported voice interactions for the web application is available, the information describing the set of supported voice interactions for the web application; and enable voice input for the web application based on the retrieved information specifying the set of one or more supported voice interactions.

Some embodiments are directed to at least one server computer, comprising: at least one storage device storing a set of information that specifies a set of voice interactions for at least one web application; and a communication interface configured to: receive from a client computer, via at least one network, a request for at least some of the set of information; and provide, via the at least one network, the at least some of the set of information to the client computer in response to the request.

Some embodiments are directed to a computer-readable storage medium encoded with a plurality of instructions that, when executed by at least one server computer, perform a method comprising: receiving from a client computer, via at least one network, a request for information that specifies a set of voice interactions for at least one web application; and providing, via the at least one network, the information to the client computer in response to the request.

Some embodiments are directed to a method, comprising: receiving from a client computer, via at least one network, a request for information that specifies a set of voice interactions for at least one web application; and providing, via the at least one network, the information to the client computer in response to the request.

Some embodiments are directed to a method of determining a collective set of supported voice interactions for a plurality of frames in a web browser including a first frame and a second frame, wherein the first frame corresponds to a first web application and the second frame corresponds to a second web application, the method comprising: determining a first set of supported voice interactions available for the first frame; determining a second set of supported voice interactions available for the second frame; determining the collective set of supported voice interactions based on the first set of supported voice interactions and the second set of voice interactions; and instructing an external speech engine to recognize voice input corresponding to the collective set of voice interactions.

Some embodiments are directed to a computer-readable storage medium encoded with a plurality of instructions that, when executed by a computer, perform a method of determining a collective set of supported voice interactions for a plurality of frames in a web browser including a first frame and a second frame, wherein the first frame corresponds to a first web application and the second frame corresponds to a second web application, the method comprising: determining a first set of supported voice interactions available for the first frame; determining a second set of supported voice interactions available for the second frame; determining the collective set of supported voice interactions based on the first set of supported voice interactions and the second set of voice interactions; and instructing an external speech engine to recognize voice input corresponding to the collective set of voice interactions.

Some embodiments are directed to a computer comprising: at least one processor programmed to perform a method of determining a collective set of supported voice interactions for a plurality of frames in a web browser including a first frame and a second frame, wherein the first frame corresponds to a first web application and the second frame corresponds to a second web application, the method comprising: determining a first set of supported voice interactions available for the first frame; determining a second set of supported voice interactions available for the second frame; determining the collective set of supported voice interactions based on the first set of supported voice interactions and the second set of voice interactions; and instructing an external speech engine to recognize voice input corresponding to the collective set of voice interactions.

Some embodiments are directed to a method of enabling voice interaction for at least one capability of a web application including one or more web pages rendered by a web browser, wherein the at least one capability is not exposed by the web browser, the method comprising: executing an agent for the web application, wherein the agent is configured to determine an identity of the web application; monitoring events in the web browser to identify at least one marker identifying information about a current context of the web application; and enabling voice interaction for the at least one capability associated with the current context in response to identifying the at least one marker, wherein the at least one capability is not exposed by the web browser.

Some embodiments are directed to a computer-readable storage medium encoded with a plurality of instructions that, when executed by a computer, perform a method of enabling voice interaction for at least one capability of a web application including one or more web pages rendered by a web browser, wherein the at least one capability is not exposed by the web browser, the method comprising: executing an agent for the web application, wherein the agent is configured to determine an identity of the web application; monitoring events in the web browser to identify at least one marker identifying information about a current context of the web application; and enabling voice interaction for the at least one capability associated with the current context in response to identifying the at least one marker, wherein the at least one capability is not exposed by the web browser.

Some embodiments are directed to a computer comprising: at least one processor programmed to perform a method of enabling voice interaction for at least one capability of a web application including one or more web pages rendered by a web browser, wherein the at least one capability is not exposed by the web browser, the method comprising: executing an agent for the web application, wherein the agent is configured to determine an identity of the web application; monitoring events in the web browser to identify at least one marker identifying information about a current context of the web application; and enabling voice interaction for the at least one capability associated with the current context in response to identifying the at least one marker, wherein the at least one capability is not exposed by the web browser.

Some embodiments are directed to a method of enabling voice interaction for invoking at least one capability of a web application including at least one web page rendered by a web browser, the method comprising: analyzing a document object model of the at least one web page to identify one or more items in the document object model at a first point in time; determining based, at least in part, on the identified one or more items, that the at least one web page comprises the at least one capability; and enabling voice input to invoke the at least one capability of the web application in response to the identifying that the at least one web page comprises the at least one capability.

Some embodiments are directed to a computer-readable storage medium encoded with a plurality of instructions that, when executed by a computer, perform a method of enabling voice interaction for invoking at least one capability of a web application including at least one web page rendered by a web browser, the method comprising: analyzing a document object model of the at least one web page to identify one or more items in the document object model at a first point in time; determining based, at least in part, on the identified one or more items, that the at least one web page comprises the at least one capability; and enabling voice input to invoke the at least one capability of the web application in response to the identifying that the at least one web page comprises the at least one capability.

Some embodiments are directed to a computer comprising: at least one processor programmed to perform a method of enabling voice interaction for invoking at least one capability of a web application including at least one web page rendered by a web browser, the method comprising: analyzing a document object model of the at least one web page to identify one or more items in the document object model at a first point in time; determining based, at least in part, on the identified one or more items, that the at least one web page comprises the at least one capability; and enabling voice input to invoke the at least one capability of the web application in response to the identifying that the at least one web page comprises the at least one capability.

It should be appreciated that all combinations of the foregoing concepts and additional concepts discussed in greater detail below (provided that such concepts are not mutually inconsistent) are contemplated as being part of the inventive subject matter disclosed herein.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated that despite the recent widespread adoption of speech recognition technologies, many web applications lack native voice-interface functionality. Because many web applications as developed do not include voice capabilities, a browser on a client computer, which is used to render such applications does not expose any voice capabilities of the web application. Some embodiments of the invention are directed to methods and apparatus for voice-enabling capabilities of a web application that have been designed without native voice interface capabilities.

Figure 1:
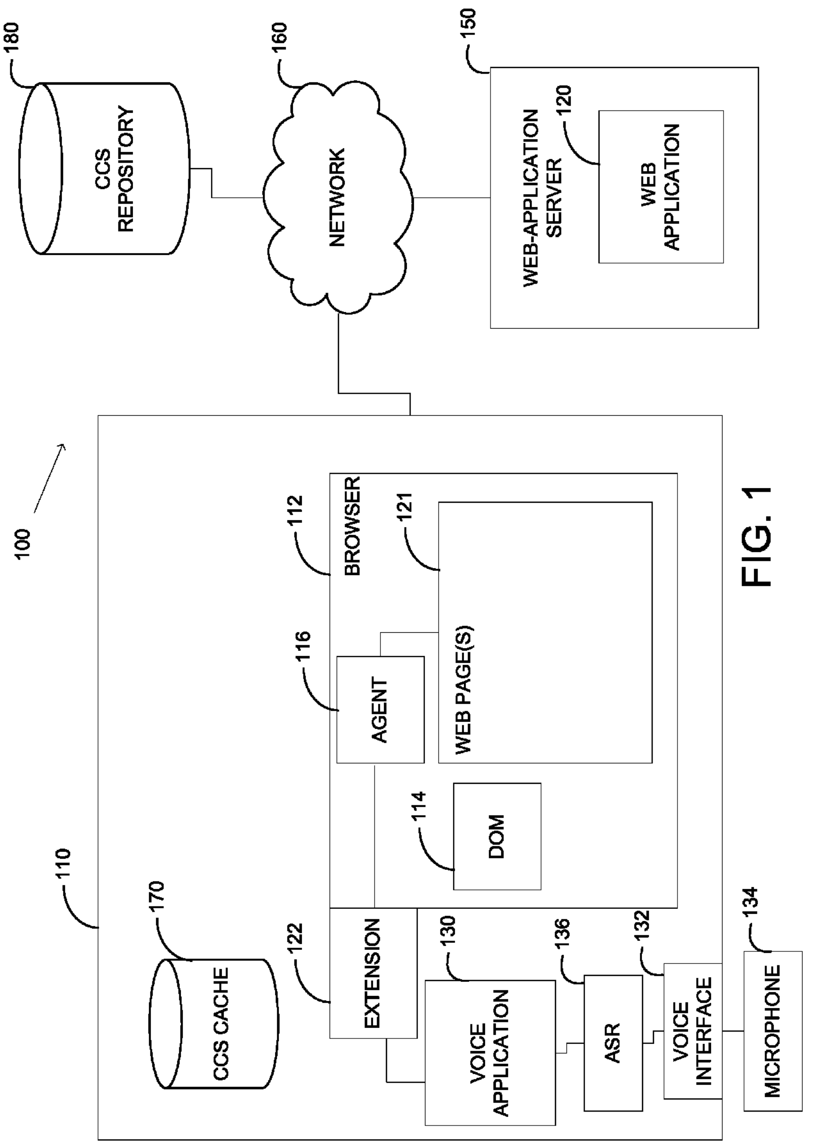
FIG. 1 is an exemplary system including components used to voice-enable a web application executing in a browser on a client computer in accordance with some embodiments of the invention.

An illustrative system 100 for use in accordance with some embodiments of the invention is shown in FIG. 1. The system 100 includes a client computer 110 configured to display a web page 121 of web application 120 rendered by a browser 112. Web application 120 may include one or more web pages 121, each of which includes one or more elements to be displayed on the web page when rendered by browser 112. When browser 112 renders a web page 121 of web application 120, the browser parses the markup (e.g., HTML) for the web page and creates a Document Object Model (DOM) 114 from it. The DOM 114 is then used by the browser, optionally in combination with one or more Cascading Style Sheets (CSS) to display the web page 121 in a browser window on client computer 110. Some web pages (but not all) use a CSS, which describes presentation semantics of a document, in combination with markup (e.g., HTML) elements because it allows for the separation of web page content (e.g., as defined by the HTML elements), and web page presentation style and format as defined in the CSS. Accordingly, the same markup content can be interpreted and displayed by the browser in different ways depending on the particular CSS that is used.

Some web pages are "static," in the sense that each user interaction with the web page would requires the entire page (or a new page) be re-loaded from an external server to reflect the update. As discussed above, more recent advances in web application development allow for web pages with rich content and more efficient client-side interactivity by allowing for "dynamic" update of web pages for a web application. Such content rich web applications (often called "rich internet applications" or "RIAs") typically use advanced application logic, such as AJAX or Adobe Flash, to implement the dynamic behavior. Web applications developed using technologies such as AJAX enable the web application to asynchronously communicate with an external server to send and receive information without interfering with the current state (e.g., display or behavior) of the page being displayed. The information received from the server(s) is used to update the current web page without requiring a full page reload. For example, if web application 120 is developed using AJAX, the web application may send and receive content to/from web application server 150 via network 160 without interfering with the web page currently displayed in the browser window.

Using advanced application logic such as AJAX for developing web applications also enables real-time updates of data on web pages, which provides the user with a more interactive experience. For example, a financial web application may include one or more web pages with a real-time stock ticker that may be updated by sending requests to and receiving data from one or more web application servers that source the data. Methods of communicating with web application server(s) in the background, such as using XMLHttpRequest JavaScript objects, are known.

Many web applications include scripts written in a scripting language such as JavaScript that execute within browser 112 and which provide an interactive user interface for a web page of the web application. Scripting functions interact with the DOM of a web page to provide functionality such as animation of page elements and interactive content. When used in combination with advanced application logic such as AJAX, scripting functions additionally enable data and/or requests for information to be sent to a server asynchronously, as discussed above.

In some embodiments, client computer 110 may also include a voice application 130 configured to voice enable at least one capability of web application 120, even though web application 120 may not have been developed with a native voice interface. Voice application 130 may be any suitable voice recognition application including, but not limited to, a general speech recognition application that also provides a voice interface for other applications executing on the client computer 110, such as Dragon™ NaturallySpeaking® or a dictation application such as Dragon™ Dictate, both of which are available from Nuance Communications, Inc.

Client computer 110 may include a voice interface 132 configured to receive voice input from one or more voice input devices such as a microphone 134. When a user speaks into microphone 134, the microphone may transform input acoustic energy corresponding to the user's speech into an electrical information which is sent as voice input to an automatic speech recognition (ASR) engine 136 via voice interface 132. The voice interface 132 may perform one or more additional functions prior to sending the voice input to ASR engine 136 including, but not limited to, analog-to-digital conversion. ASR engine 136 receives the voice input from the voice interface 132 and performs speech recognition on the voice input to recognize the content of the received voice input.

Although ASR engine 136 is illustrated in FIG. 1 as being included as a portion of client computer 110, ASR engine 136 may alternatively be located remotely from client computer 110 and may be in communication with client computer 110 using any suitable communication medium or mediums (e.g., one or more networks). In some embodiments, client computer 110 may be associated with one or more local ASR engines 136 and one or more remotely located ASR engines, whereby at least some received voice input is processed by the one or more local ASR engine(s) and at least some received voice input is processed by the one or more remotely-located ASR engines. Examples of such distributed ASR systems are known. Voice input sent to the one or more remote ASR engine(s) for recognition using one or more communication medium(s) (e.g., one or more networks) connecting the client computer 110 and the ASR engine(s) may be returned to the client computer 110 from the remotely-located ASR engine (s) using the same or different communication medium(s). Voice input recognized by ASR engine 136 (and/or remote ASR engine(s)) is provided to voice application 130 and the recognized voice input may be used to control at least one capability of web application 120, as discussed in more detail below.

Many browsers include APIs to query the objects in the DOM to allow a requesting application visibility into what was rendered by the browser. In web applications that use static web pages that are fully reloaded in response to a user interaction, voice application 130 may send a request to browser 112 and the browser may use one or more APIs to learn the content of DOM 114 for the particular web page that is being rendered by browser 112. Under these circumstances, because there is no dynamic update of the content of the web page, the DOM 114 contains all of the information about each of the elements of the web page, as each is specified in the markup (e.g., HTML) for the web page, which was parsed by the browser when the page was loaded. The voice application may be programmed to include instructions to voice enable the discoverable elements in the DOM, e.g., by associating particular voice input with an action to perform on a particular HTML element.

As discussed above, some web applications use advanced application logic to program (e.g., with Javascript) one or more visual elements in the DOM to respond to user interactions (e.g., mouse clicks, keystrokes, etc.). When visual element(s) of the DOM are programmed in such a way, inspection of the contents of the DOM is insufficient to determine the nature and/or purpose of the programmed element(s) as the detail about the content of the element(s) is not ascertainable from the DOM. Moreover, without the ability to determine which DOM elements are user interface elements and what their behavior should be, it is difficult to determine which elements to speech-enable and how to speech-enable them.

The inventors have recognized and appreciated that it is a challenge to enable voice support for web applications that include web pages with elements that are not identifiable from an inspection of the contents of the DOM. Some embodiments are directed to providing techniques to voice enable such web pages.

In accordance with a non-limiting example, a conduit for information between voice application 130 and an agent 116 (e.g., a plugin) executing inside browser 112 is provided. The agent 116 is configured to access the browser's environment to facilitate voice enablement of at least one capability of the web application presented by the browser. In one embodiment, the agent 116 comprises one or more modules configured to facilitate a loading of the agent by the browser for a web page that is displayed (e.g., by using extension 122) and to access local storage and to communicate with a speech engine. It should be appreciated that the agent 116 may be implemented to enable any other functionality as embodiments are not limited in this respect.

In some embodiments, the extension 122 may be customized for a particular type of browser (e.g., Internet Explorer, Firefox, Safari, etc.), and/or a particular operating system platform (e.g., Microsoft Windows, Mac OSX, Linux, etc.) executing on computer 110. In such embodiments, extension 122 may be configured to be both operating system- and browser-specific because browsers are often customized to interact with components of each operating system differently. However, the particular manner in which extension 122 is implemented does not limit embodiments of the invention.

To prevent security vulnerabilities to viruses, etc., browser security modules typically restrict access to operating system APIs (e.g., file system, network) to agent(s) (e.g., plugins) that are executing for a particular web page. Because agents are given access to operating system APIs, browsers prohibit plugins from automatically loading themselves into any arbitrary web page. Rather, an agent must be loaded after a web page has been rendered by the browser. In one non-limiting example described herein, extension 122 is configured to load agent 116 in response to determining that a web page has been rendered by the browser. Because the nature of web page elements is not readily ascertainable from the DOM for some web applications (e.g., rich internet applications), agent 116, once loaded, executes within the browser to monitor the web application 120 to identify current context(s) of the application and provide information to voice application 130 when the context changes. Information about the current context(s) of the application may be provided to voice application 130 in any suitable way, as embodiments are not limited in this respect.

In some embodiments, client computer 110 may include a plurality of browsers 112, and each browser may be associated with a different extension 122 that is configured for use with a particular browser. However, all embodiments are not limited to this, and some embodiments may include one universal extension configured to work with all browsers.

As discussed above, in some embodiments, when a browser is launched on client computer 110, and each time a new web page is loaded, extension 122 may facilitate the loading of the agent 116 for the new web page. As a result, as discussed in more detail below, when a set of one or more supported voice interactions for a particular web application is available, agent 116 executing within the browser, monitors events for particular web application pages. Because the extension 122 may be configured to execute whenever its associated browser 112 is launched, extension 122 is not given access to restricted operating system APIs to prevent security vulnerabilities. For example, in some embodiments, the functionality of the extension 122 may be restricted to activities such as loading the agent 116 in the browser 112 when a new web page is rendered by the browser.

In some embodiments, agent 116 (e.g., a plugin) may comprise a set of computer-executable instructions that, when executed within browser 112, provide additional functionality to web applications executing in the browser. For example, agent 116 may facilitate the discovery of information about a state or context of a web page of the web application, which is not readily discernible from querying the DOM of the browser and this information can be used in any suitable way. For example, in one embodiment, the information may be used to enable voice capabilities not native to the web application 120, although the information may alternatively be used in some other way. Agent 116 may be a natively compiled module (i.e., a plugin) programmed in accordance with the NPAPI standard, or agent 116 may be any other suitable set of computer-executable instructions that implement a browser plugin API, as the aspects of the disclosure relating to the use of a plugin are not limited to any particular implementation.

In some embodiments, agent 116 may be configured to gather information about aspects of the web application 120 on behalf of voice application 130 to determine whether and which capabilities of the web application can be voice enabled. In addition, the agent may be configured to gather information about each web page to determine which (if any) of the commands supported by an application are relevant and available for each particular web page. In accordance with some embodiments, agent 116 may be configured to determine a current context of a web application or applications by monitoring one or more markers active in the web page displayed by the application(s). Rather than directly identifying elements from the DOM, agent 116 may be configured to use DOM events (e.g., a load event) to discover information about the HTML elements of the page itself to determine the current context for the web application. For example, the web application may be an email application such as Gmail™ provided by Google, Inc. or Microsoft Hotmail® provided by Microsoft Corporation. Each of these email web applications may include a plurality of web pages focused on different aspects of the email application. For example, an email application may include an "Inbox" web page, a "Compose message" web page, and a "Spam" web page. Each of these web pages is associated with a different context of the application, and may have different elements, commands, and/or actions that may be voice enabled in accordance with some embodiments. Agent 116 may use one or more browser DOM APIs to monitor for one or more markers to determine and identify the current context of the web application. For example, agent 116 may monitor for a "Send" user interface (UI) element to be displayed on the web page and in response to determining that the "Send" UI element is present, the agent may determine that the "Compose message" context is active and send information regarding this context to voice application 130, thereby enabling the voice application to make active the voice commands relevant to that context. Although this example describes monitoring for a particular UI element to determine the current context, it should be appreciated that agent 116 may employ any suitable technique for determining the context, and is not limited to monitoring for a particular UI element on the page to determine context.

In some embodiments, agent 116 may be configured to determine an identity of a web application in response to a web page being loaded by browser 112. The identity of a web application may be determined in any suitable way. As one non-limiting example, the identity of a web application may be determined based, at least in part, on an identifier for the web page loaded by the browser. For example, the identifier for the web page may be the Uniform Resource Locator (URL) associated with the web page, distinctive content displayed on the web page (e.g., the Gmail™ logo), or some other identifier. In response to determining the identity of a newly-loaded web application, agent 116 may determine whether the web application is associated with a set of one or more voice interactions that provide a voice interface for the web application. This can be done in any suitable way. For example, in one embodiment, the agent 116 may have information in a data structure stored locally on the same computer on which the agent is installed and that identifies applications for which the agent supports voice interaction and identifies for each application, the particular voice commands that are supported. Thus, each agent installed on a computer may have its own data structure with information that identifies what applications and commands are voice enabled. However, in other embodiments, the information may be stored remotely from the agent and the computer on which the agent is installed, in a manner that makes the information globally accessible (e.g., over the Internet or another network) to multiple agents on different computers. This enables updates to the information to be made and quickly and easily distributed to multiple agents (which can include thousands or more), without having to individually update separate data structures maintained for each agent.

In some embodiments, the set of one or more voice interactions for a web application are specified in a data structure called a Contextual Command Sheet (CCS), as described in more detail below. In embodiments that use a CCS, agent 116 may issue a query to the CCS (e.g., which may include a local CCS cache 170 and globally-accessible CCS repository 180 as shown in FIG. 1 and described below) to determine whether a CCS for the identified web application is available. A CCS data structure may be a simple document or take any other suitable form and examples of CCSs for specifying a set of one or more voice interactions for a web application are described in more detail below.

Figure 2:
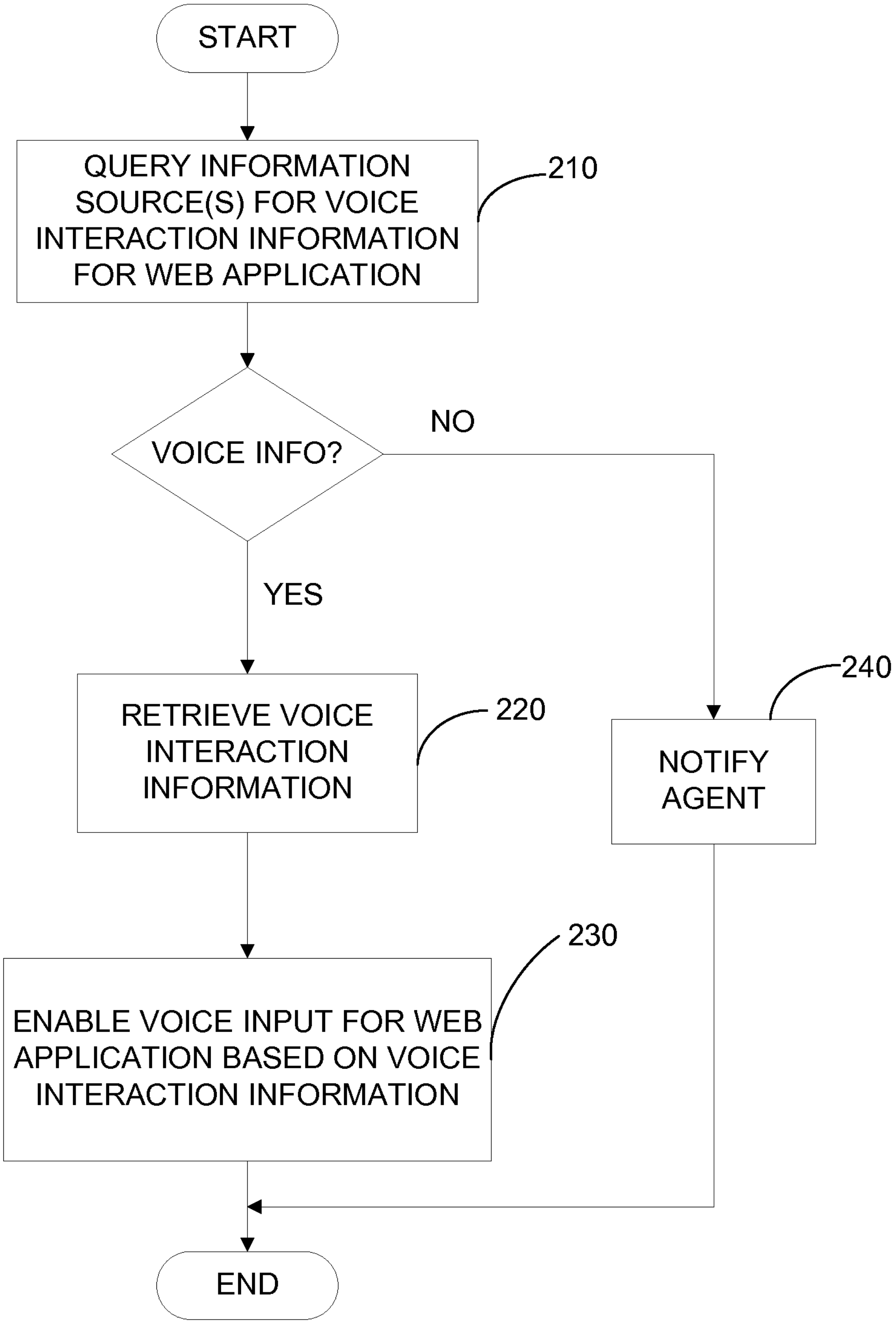
FIG. 2 shows an illustrative process for enabling voice interaction(s) for a web application in accordance with some embodiments of the invention.

FIG. 2 shows an illustrative process for enabling voice input for a web application in accordance with some embodiments. In act 210, one or more information sources external to a web application (e.g., a CCS) are queried by an agent executing in a web browser to determine whether information describing a set of one or more supported voice interactions for the web application is available. As discussed above, in some embodiments, prior to querying the information source(s), the identity of the web application may be determined in any suitable way (e.g., using the URL of the web page currently loaded in the browser). The one or more information sources may then be queried by sending a request that includes the identity of the web application to the information source(s).

Some embodiments may include an information source such as a collection of CCSs (e.g., a manifest which can be stored in a single document, multiple documents, or any other suitable data structure) stored at a location accessible to the client computer 110 locally or over one or more networks. For example, the information may be located on a publically-accessible server (e.g., located at the URL http://nuance.com) configured to receive requests for information. In some embodiments, the information stored on the publically-accessible server may include the identities of all web applications for which there is a corresponding CCS, where each CCS defines the set of supported voice interactions for the corresponding web application. In some embodiments, in response to consulting a manifest file stored locally, a request for a remotely-stored CCS may be sent from the client computer to the server, wherein the request includes a unique identifier for the web application.

In response to receiving the request, the server may determine whether the web application identified in the request is associated with voice interaction information. If not, the process proceeds to act 240 where a response to the request is sent (e.g., to the requesting agent) to indicate that the web application cannot be voice enabled. If it is determined that there is voice interaction information for the web application, the process proceeds to act 220, where the voice interaction information is retrieved. The voice interaction information may be retrieved in any suitable way from any suitable information source. In one embodiments, as shown in FIG. 1, client computer 110 may include a local data source such as CCS cache 170 configured to store one or more CCSs that have already been retrieved from an external information source such as CCS repository 180. Providing some CCSs locally in a cache provides an advantage of quicker access by not requiring access to a remotely-located information source, however, embodiments are not limited to using a cache and the CCSs may be stored in any location accessible to a requesting agent. In some embodiments, information (e.g., a CCS) including voice interaction information for a web application may be associated with a particular version of that information (e.g., a CCS version), and the CCS cache 170 may be queried to determine whether the version of the CCS in the CCS cache 170 for the loaded application is the most recent version. In one embodiments, if it is determined that a more recent version is available, the more recent version of the CCS may be retrieved from the external information source (e.g., CCS repository 180). In other embodiments, the external information source may store information about which agents have which CCSs and if the version of the CCS is updated, the updated version of the CCS may be pushed to computers with older versions of the CCS. In yet other embodiments, when a CCS is updated to a new version on the external information source, a notice may be sent to all agents with older cached versions of the CCS to flush the cached copy so the new version will be used the next time the corresponding web application is launched. The current version of the CCS may be accessed and provided locally to a requesting agent in any suitable way and the techniques described above are provided for merely illustrative purposes.

If it is determined that there is no available CCS (either in the CCS cache 170 or at an external information source) for the web application loaded in the browser, it may be determined that there is no voice support for the application and execution of the web application may proceed normally. Otherwise, if it is determined that a CCS is available for the loaded web application, the process proceeds to act 230, where the web application is enabled for voice input based, at least in part, on the voice interaction information defined in the CCS.

Voice enabling the web application may be performed in any suitable way. In some embodiments, agent 116 executing inside of browser 112 may instruct voice application 130 to dynamically configure its grammar for recognizing input speech based, at least in part, on a current context of the web application and the voice commands that the CCS indicates are enabled for that web application. For example, the CCS may specify the full set of voice enabled commands for the application, and the agent may determine the current context and only instruct the voice application to enable the commands relevant for the context. It should be appreciated that all embodiments are not limited to constraining the voice enabled commands to the relevant context, but that this is done in some embodiments to attempt to improve the accuracy of the voice recognition by constraining it to choosing between only commands for actions relevant to the context.

In some embodiments, each CCS may be a document (e.g., an XML document) or some other data structure that includes information mapping speech input (e.g., voice commands) to particular elements of the web application. An illustrative portion of a CCS for the web application Gmail™ using XML is shown below.

```
    <?xml version="1.0" encoding="UTF-8"?>
<ccs>
  <id>gmail</id>
  <name>GMail</name>
  <urlmarker>google.com/mail/</urlmarker>
  <version>1</version>
  <lang>en</lang>
  <context id="base">
    <description>Global</description>
    <cmd name="showwebsitecomands">
      <sample>Show [web] site commands</sample>
      <trigger>Show {website|site} commands</trigger>
      <invokeScript> nuan_whatCanISay( ); </invokeScript>
    </cmd>
    <cmd name="compose">
      <sample>[click:Click] Compose | Compose new email</sample>
      <marker>.z0 div</marker>
      <trigger>{[click:Click] Compose|Compose new email</trigger>
      <invokeScript> nuan_el = nuan_getElement(marker);
        nuan_mousedown(nuan_el); nuan_mouseup(nuan_el);
      </invokeScript>
    </cmd>
    <cmd name="inbox">
      <sample>[click:Click] Inbox, | Go to Inbox</sample>
      <marker>a.J-Ke[href$=inbox]</marker>
      <trigger> {[click:Click]|Go To} Inbox</trigger>
      <invokeScript> var el = nuan_getElement(marker);
        nuan_click(el); </invokeScript>
    </cmd>
  </context>
  <context id="compose">
    <description>Composing Message</description>
    <marker>.T-I.J-J5-Ji.Bq.nS:visible</marker><!-- send button -->
    <cmd name="gototo">
      <sample>Click To | Go to To</sample>
      <trigger>{Click|Go to} To </trigger>
      <invokeScript>
        nuan_getElement('textarea[name=to]:visible').focus( );
      </invokeScript>
    </cmd>
    <cmd name="gotosubject">
      <sample>[click:Click] Subject | Go to Subject</sample>
      <trigger> {[click:Click]|Go to} Subject</trigger>
      <invokeScript>
        nuan_getElement('input[name=subject]:visible').focus( );
      </invokeScript>
    </cmd>
```

-continued

```
    <cmd name="gotobody">
      <sample>[click:Click] Body | Go to Body</sample>
      <trigger> {[click:Click]|Go to} Body </trigger>
      <invokeScript> nuan_getElement('body.editable:visible').focus( );
      </invokeScript>
    </cmd>
    <cmd name="discard">
      <sample>[click:Click] Discard | Discard Message</sample>
      <marker>.T-I.J-J5-Ji.Bq.lX.T-I-ax7.L3</marker>
      <trigger> {[click:Click] Discard|Discard message}</trigger>
      <invokeScript> var nuan_el = nuan_getElement(marker);
        nuan_mousedown(nuan_el); nuan_mouseup(nuan_el);
      </invokeScript>
    </cmd>
  </context>
</ccs>
```

As can be appreciated from the illustrative CCS above, a CCS defines a set of voice interactions (e.g., "Discard Message," "Go to Subject") that correspond to voice commands that a user may invoke to control the functionality of the email application. In some embodiments, the CCS may define during which context each of the voice interactions in the set is active, although not all embodiments are limited in this respect. The set of voice interactions defined in any particular CCS may include any suitable commands for controlling any capabilities of a web application that the application natively provides the ability to control (albeit without voice). In this manner, rich command and control of the application by voice can be provided to create a rich voice experience, without requiring web application designers to incorporate a voice interface during design of the application.

Figure 3:
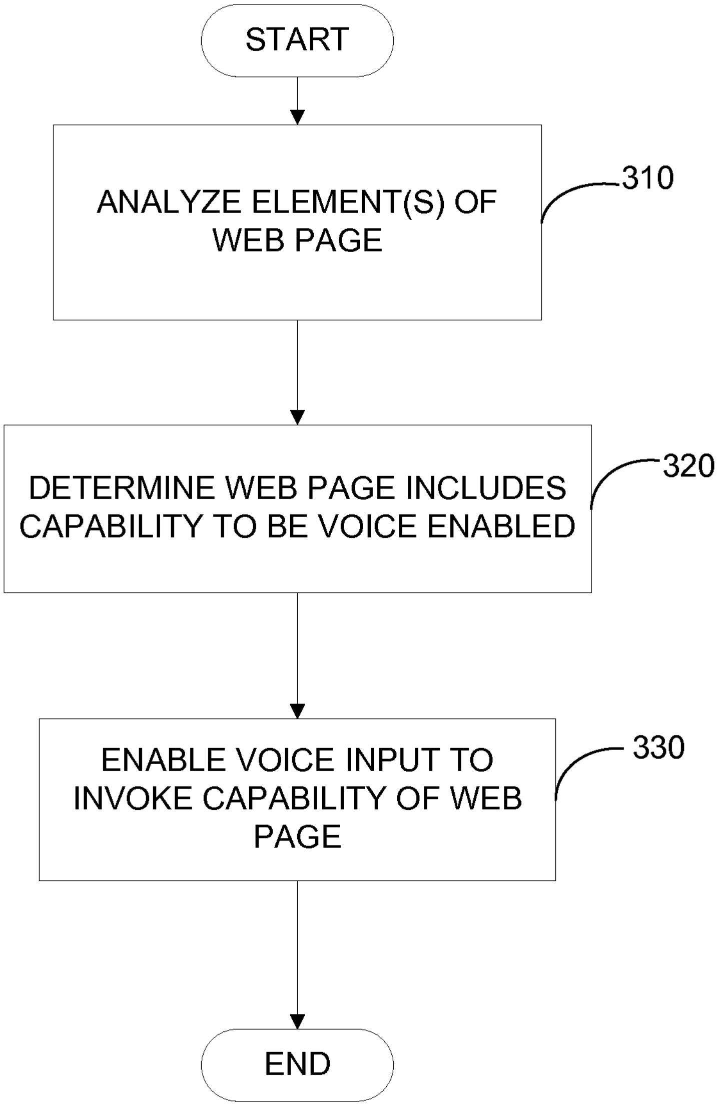
FIG. 3 shows an illustrative process for enabling voice input for a web page of a web application based, at least in part, on a context of the web application in accordance with some embodiments of the invention.
Figure 4:
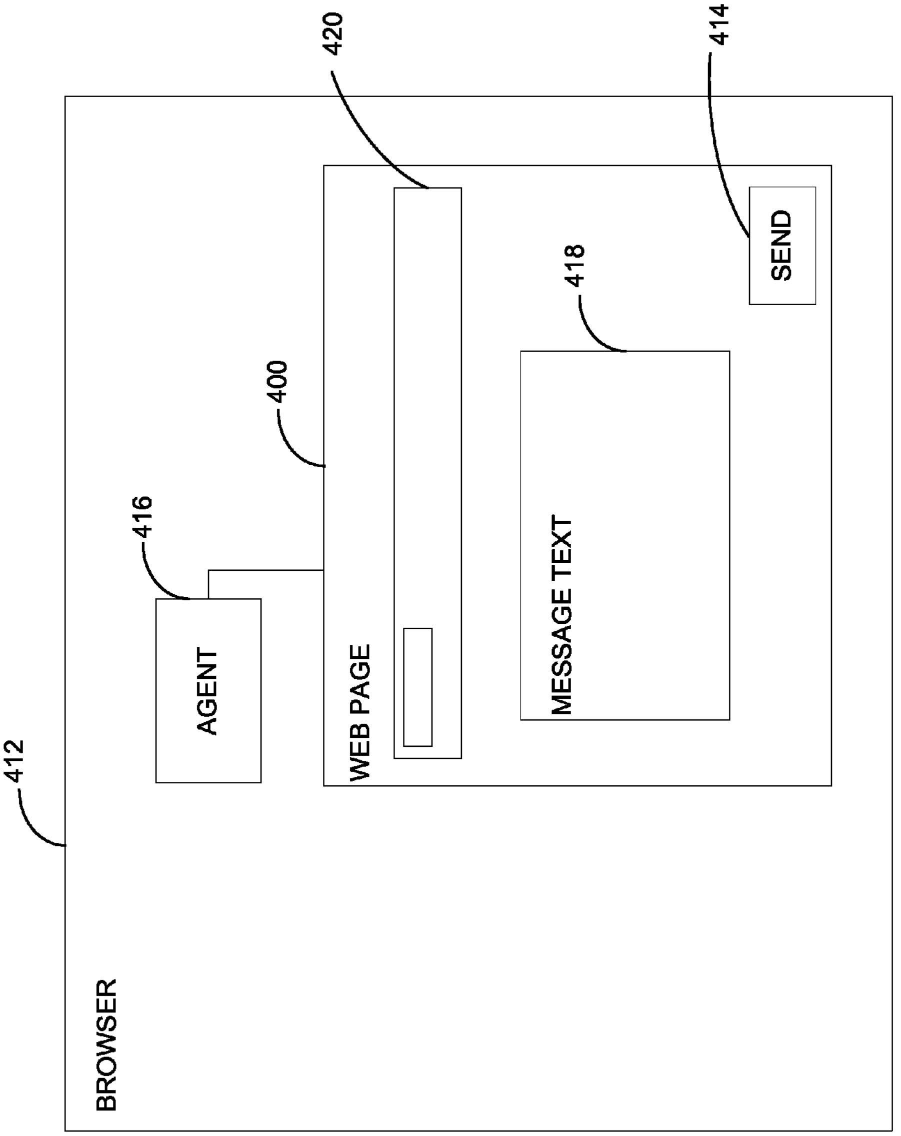
FIG. 4 is a schematic illustration of a web application including a plurality of markers, one or more of which may be used in determining a context of the web application in accordance with some embodiments of the invention.

In some embodiments, as described above, agent 116 may interpret a CCS to determine which voice interactions to enable and which to disable based, at least in part, on a current context of the web application. FIG. 3 shows an illustrative process for determining which of the set of voice interactions to enable/disable in accordance with some embodiments. In act 310, an agent (e.g., NPAPI plugin) executing in the browser analyzes one or more elements of the currently loaded web page to determine the context of the web application. For example, as described above, in some embodiments, the agent may handle DOM events to trigger the execution code that analyzes whether a particular marker is present on the web page, and based on which marker(s) are present, the current context may be determined. The process then proceeds to act 320, where it is determined whether the web page includes a capability to be voice enabled. For example, FIG. 4 shows an illustrative web page 400 of an email web application rendered in browser 412. In response to determining that the web application has a corresponding CCS, the agent 416 has loaded the CCS and proceeds to monitor for one or more markers specified in the CCS that indicate the current context of web application. For example, the CCS may include information that states that when a send UI element 414 is present the corresponding context for the web application is "Compose Message." Because a send UI element 414 is present on the currently rendered web page 400 as shown in FIG. 4, the agent 416 may determine that the context is "Compose Message," and the agent may query the CCS to determine which voice interactions should be enabled for this context.

After determining which voice interactions should be enabled, the process of FIG. 3 proceeds to act 330, where voice input for the current context is enabled to invoke the appropriate voice capabilities as specified in the CCS. Although the determination of context in the above-described example is made by detecting only a single marker (i.e., send UI element 414), the CCS may alternatively specify that detection of more than one marker (any suitable number) be used to determine a particular context, as embodiments are limited in this respect. For example, a determination of a particular context may be specified not only on detection of send UI element 414, but also on detection of message text box 418 and/or compose message toolbar 420.

Voice enabling at least some portions of the web application in accordance with the information in a CCS may be accomplished in any suitable way. In one embodiment, the CCS for the web application may indicate a set of voice commands to activate and the ASR may be configured to recognize the voice commands in the set.

For example, the set of voice commands may include the command "Send" corresponding to an action of sending an email message in a web application such as Gmail™. In response to identifying user input corresponding to the command "Send," the voice application may provide information to the agent executing in the browser to inform the agent that "Send" voice command has been invoked. This information may be transferred from the voice application to the agent in any suitable way, such as using one or more APIs. After the agent has received the information indicating that the user has invoked a voice command, the agent may use the CCS to determine which action to perform that corresponds to the input voice command and the agent may use one or more APIs to instruct the web application to perform the one or more actions associated with the voice command.

The CCS may specify a link between the voice command and a corresponding action to perform in any suitable way. In one embodiment, all of the information need to invoke a particular action may be included in the CCS itself. In other embodiments, information in the CCS that links a voice command to one or more actions to be perform may be specified using one or more links to one or more functions (e.g., a JavaScript file, a library file) having computer-executable instructions located somewhere other than the CCS. Providing some functionality for describing action(s) to associate with voice commands in locations other than the CCS may be advantageous in some circumstances, such as when the action to be performed includes complex behavior, which may include many instructions (e.g., to instruct APIs) to perform to accomplish the complex behavior. The particular way in which instructions are specified, either in the CCS itself, or in one or more other data structures that the CCS references, is not a limitation on embodiments of the invention and any suitable implementation may be used. Additionally, although the example described above indicates that actions with complex behavior may include instructions in the CCS that link to other data structures, it should be appreciated that the CCS may include instructions that link to other data structures for any action regardless of the complexity of the action to be performed.

As discussed above, voice application 130 may include one or more grammars and/or vocabularies that are active only for some particular contexts of a web application loaded in the web browser. The CCS may define the particular voice inputs and/or grammars that should be active for any particular context within the web application, and this information may be provided to voice application 130 in response to determining an initial context of the web application and when the context of the web application changes as determined by agent 116.

In some embodiments, a CCS may define some voice interactions as always being active for a particular web application irrespective of the particular context. For example, a CCS may define voice input such as "Close," "Exit," and "Minimize" as always being active for all web pages in the web application.

In addition to, or instead of, mapping explicit voice commands to actions to perform in the web application using a fixed grammar, some embodiments may employ a CCS that uses free-form input to enable the user to interact with the web application without having to know the exact voice command mappings that the user must speak to invoke one or more commands or perform one or more actions. In such embodiments, the voice application may recognize whatever the user is saying using, for example, a natural language understanding (NLU) model, and the voice application will attempt to infer an action the user wants to perform based on the NLU result.

Some embodiments may include a combination of a fixed command grammar for certain actions and free-form input for others. For example, the fixed command "Send message," when recognized may send an email message, whereas a free-form or dictation grammar may be used to allow a user to dictate into an editable text field on a web page. Other embodiments may support an action that mixes fixed and free form input, such as a user saying "Send Mom and email that I'll be an hour late" and compose and send the requested email.

Additionally, in some embodiments a single voice input may be mapped to performing multiple actions in accordance with information in a CCS. For example, a user may say "Send email to Tom Smith, subject dinner," and the response to this input may be to cause the address and subject fields in an email application to be filled in response to receiving the voice input. This may be accomplished, for example, by looking up the corresponding email address for the desired recipient (i.e., Tom Smith) in an address book maintained for a user by the web application to determine if a corresponding contact is in the address book. If the recipient is found in the address book, the address for the recipient may be entered in the address field. Similarly, with the subject field, the CCS may specify the voice input for filling in the subject field as follows: subject <dictation>, where <dictation> refers to free-form input after the command word "subject."

In some embodiments, a browser may have multiple web applications open at the same time (e.g., Gmail™ and Facebook®) and each web application may be associated with a different agent that is launched in association with the instance of the browser associated with the web applications. In some embodiments, when the web applications are executing in different browser windows, the context for determining which voice interactions should be active may be determined based on which browser window has the current focus. When the current focus is changed (e.g., by selection of a different window), the set of voice interactions that are active may also change due to a new window having the focus.

In other embodiments, when multiple browser windows are open, the set of voice interactions that are active may be determined in some way other than being based on which window currently has the focus. For example, the set of active voice interactions may include all voice interactions for all windows that are open regardless of whether they are have the focus or not, as embodiments of the invention are not limited in the particular manner in which the set of voice interactions is determined when multiple applications are open.

Figure 5:
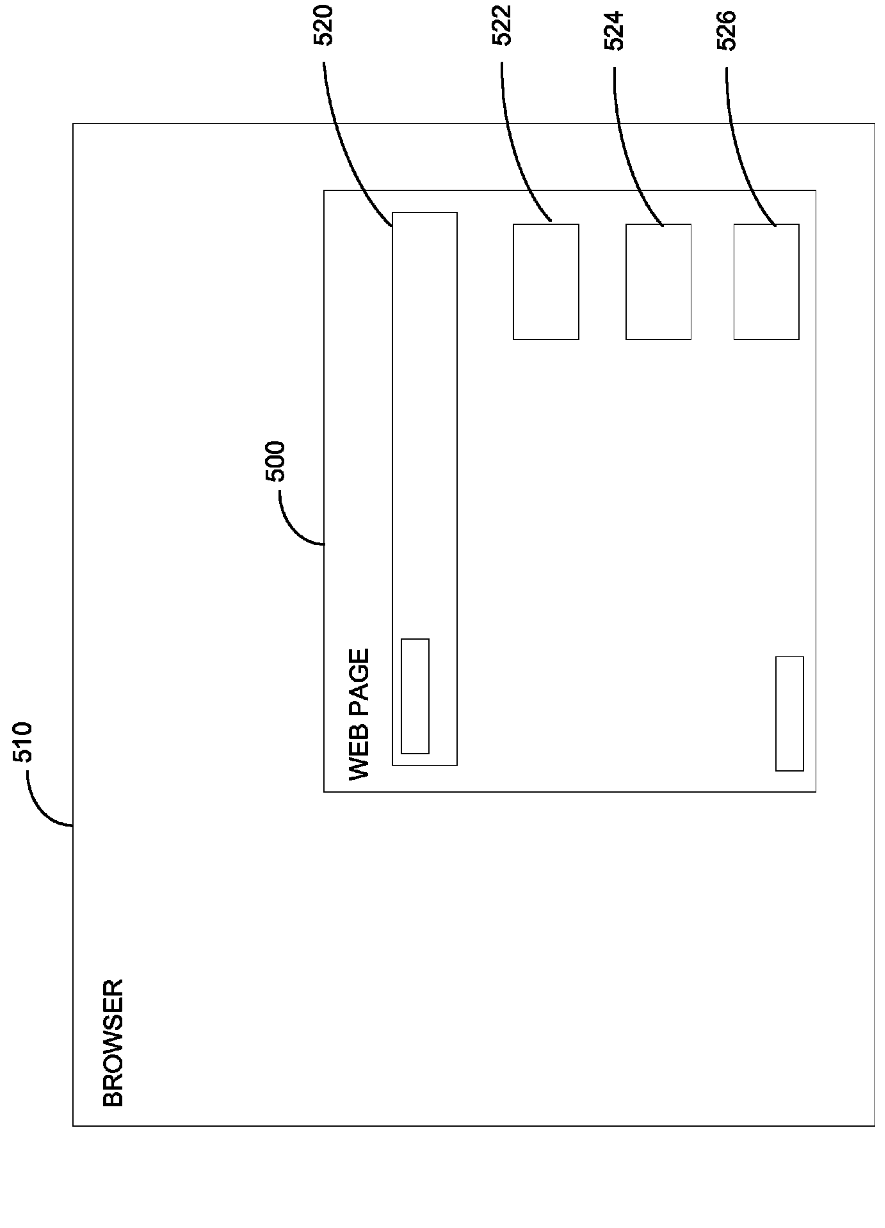
FIG. 5 is a schematic illustration of a voice-enabled web page in accordance with some embodiments of the invention, wherein the web page includes a plurality of frames associated with different sets of voice interactions defined for a web application associated with the respective frame.

In some embodiments, a single web page may have multiple web applications executing thereon. In such embodiments, each of the web applications may be associated with a particular frame (or sub-frame) on the web page. An example of this type of scenario is illustrated in FIG. 5, which shows a web page 500 loaded by a browser. Web page 500 includes a plurality of fields including toolbar 520 that may be associated with a first web application (e.g., Google Search), an analytics frame that may be associated with a second web application (e.g., Google Analytics), an advertising frame 524 that serves up ads from particular vendors, and a map frame 526, which displays a map provided by another web application (e.g., Google Maps).

Some embodiments are directed to determining a collective set of supported voice interactions for a web page including multiple frames, wherein at least two of the frames are associated with different web applications, and wherein each of the at least two frames that are associated with different web applications have CCSs available to allow a user to use voice input to perform an action in one or more of the frames with which voice input is available. In some embodiments, each of the frames may be associated with a different agent. That is, a first agent associated with a first frame may be configured to monitor events in the first frame to determine a context for the first frame and a second agent associated with a second frame may be configured to monitor events in the second frame to determine a context for the second frame.

Figure 6:
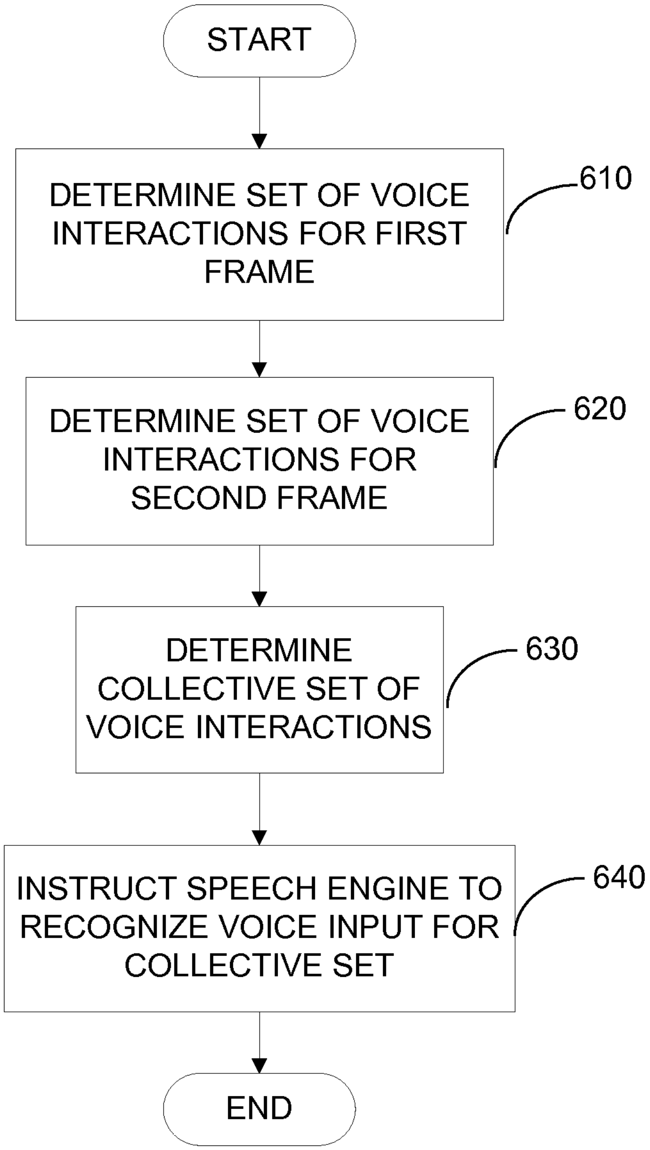
FIG. 6 shows an illustrative process for determining a set of collective supported voice interactions when at least two web applications are present in a single web page in accordance with some embodiments of the invention.

FIG. 6 shows an illustrative process for determining a collective set of supported voice interactions in accordance with some embodiments. In act 610, based, at least in part, on the context associated with the first frame, a first set of supported voice interactions may be determined from the CCS associated with the web application executing in the first frame. For example, if the web application executing in the first frame is Google™ Search and a CCS for Google™ Search is available and has been accessed by the first agent, the first set of supported voice interactions may be determined based on the CCS for Google™ Search in response to determining the current context of the web application in the first frame.

The process then proceeds to act 620, where a second set of voice interactions is determined for the web application executing in the second frame. For example, if the web application executing in the second frame is Google™ Maps and a CCS for Google™ Maps is available and has been accessed by the second agent, the second set of supported voice interactions may be determined based on the CCS for Google™ Maps in response to determining the current context of the web application in the second frame.

The process then proceeds to act 630, where a collective set of supported voice interactions for the web page is determined. The collective set of supported voice interactions may be determined in any suitable way, as embodiments of the invention are not limited in this respect. For example, in some embodiments the collective set of supported voice interactions may include all (i.e., the union) of the voice interactions for the contexts in the first set and the second set. In other embodiments, the collective set of supported voice interactions may include less than all of the voice interactions in the combined first set and second set.

In response to determining the collective set of supported voice interactions for the web page, the process proceeds to act 640, where the speech engine is instructed to recognize the collective set of voice interactions. For example, if the web page includes two frames with the web applications Google™ Search and Google™ Maps respectively executing therein, as described in the examples above, the set of collective supported voice interactions may include voice commands such as "Search," and "Find," for which the CCS for Google™ Search may define particular actions in the Google™ Search frame, and the set of collective supported voice interactions may also include voice commands such as "Pan left" and "Zoom," for which the CCS for Google™ Maps may define particular actions in the Google Maps frame. Although the discussion below refers to a CCS for storing information about mapping voice commands to functionality in a web page, it should be appreciated that any data structure may alternatively be used, as embodiments of the invention are not limited in this respect.

As should be appreciated from the foregoing, the creation of a data structure (e.g., CCS) to map natural speech to control aspects of web applications is very flexible, as any desired mapping may be described in the data structure (e.g., CCS). The inventors have also recognized and appreciated that web applications are frequently updated with new functionality and voice enabling the new functionality using conventional methods (e.g., by requiring a new version of the voice application) is quite cumbersome. An advantage of some embodiments of the invention that use relatively simple data structures such as CCSs is that updates in functionality to a web application are easy to handle, merely by modifying an existing CCS for the web application to include voice instructions for the new functionality or, in the case of substantial changes to the web application, writing a new CCS for the web application that replaces the previous one. By making the CCSs publicly available, updates to voice enable new functionality for updated web applications can be rapidly disseminated without having to update the voice application on any of the client computers. For example, the next time a user loads a particular web application in their browser, some embodiments will automatically detect that a new version of the CCS is available and will access (e.g., download) the new CCS for use during the browsing session. Moreover, all of these steps for updating a CCS may be performed without informing the user that the underlying CCS for the web application has changed so the process is transparent to the end user.

To enable the centralized creation and updating of CCSs, some embodiments are directed to a web-accessible repository of CCS(s) each of which specifies a set of voice interactions for at least one web application. By maintaining control over the set of CCSs that are used in accordance with some embodiments of the invention, the validity and security of such information may be better ensured than if users had the capability to write their own CCS for a web application. The repository of CCSs may be associated with one or more server computers configured to receive requests for CCSs from one or more client computers. The one or more server computers may include a communication interface configured to receive a request for a CCS. The request may include the identity of a web application determined, for example, by an agent executing in a web browser of the client computer, as described above.

Figure 7:
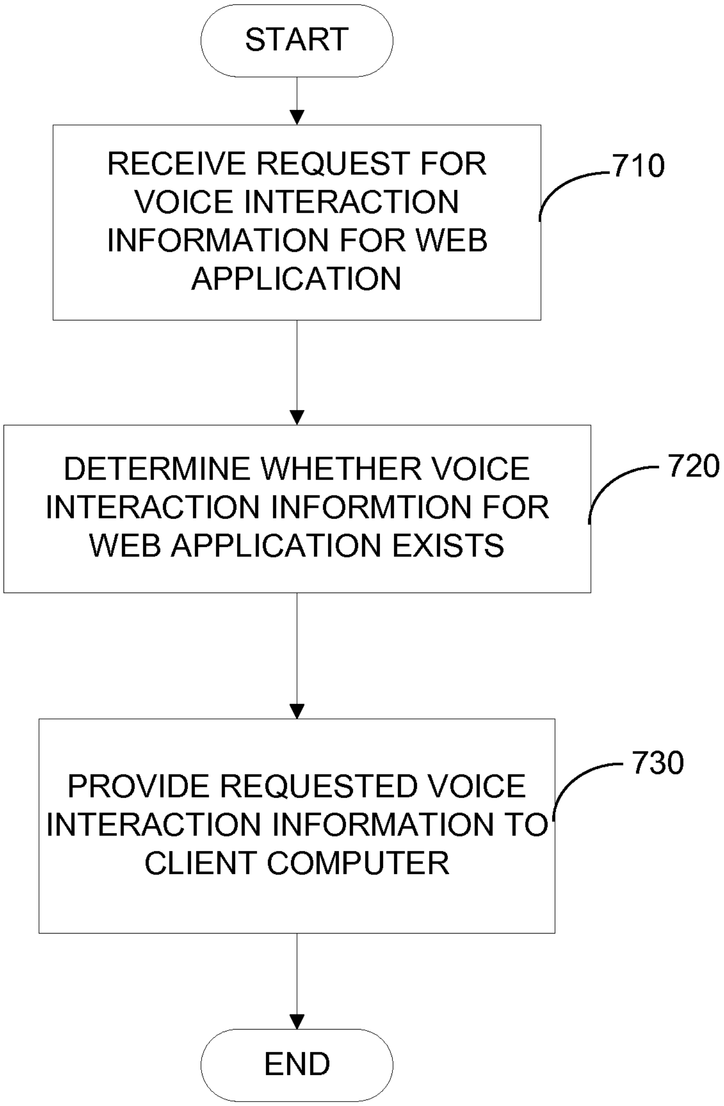
FIG. 7 shows an illustrative process for providing information specifying a set of voice interactions from a web-accessible repository to a client computer in response to a request in accordance with some embodiments of the invention.

FIG. 7 shows an illustrative process for providing a CCS from a web-accessible repository of CCS(s) in accordance with some embodiments. In act 710, a request for voice interaction information for a web application is received by the one or more servers associated with the web-accessible CCS repository. In response to receiving the request, the process proceeds to act 720, where it is determined whether the web application identified in the request has a corresponding CCS that has been defined for use with the web application. This may be determined in any suitable way. For example, the repository may include a document (e.g., a manifest), which lists the identity (and optionally the versions) of each of the web applications for which a CCS has been created and is available.

If it is determined in act 720 that a CCS for the web application identified in the request is available, the process proceeds to act 730, where the requested CCS is provided to the client computer that issued the request. In some embodiments, prior to issuing the request to a remotely-located server computer, the client computer may determine if the client computer already has a local copy of the current version of the CCS, and if a local copy is found, a request to the remotely-located server may not be sent. This determination may be made in any suitable way. For example, prior to issuing a request to the web-accessible repository, the agent executing in the browser of the client computer may check local storage to determine if the required CCS is already stored locally. If a locally stored copy of the CCS is found, it may be determined whether the locally stored copy is the most recent version. In some embodiments, a data structure (e.g., a file or document) including information about the current versions of CCSs available may be periodically downloaded to the client computer to make this determination.

Figure 8:
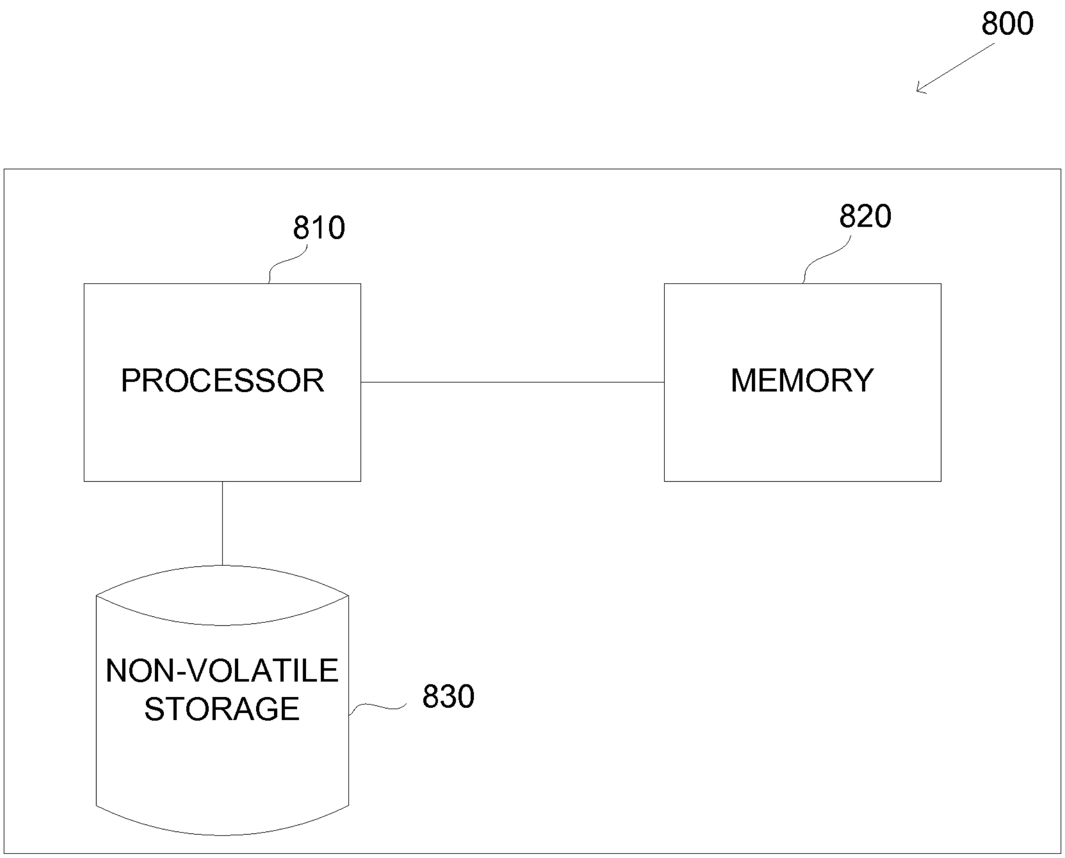
FIG. 8 is an illustrative client computer system that may be used in connection with some embodiments of the invention.

An illustrative implementation of a client computer system 800 that may be used in connection with any of the embodiments of the invention described herein is shown in FIG. 8. The computer system 800 may include one or more processors 810 and one or more computer-readable non-transitory storage media (e.g., memory 820 and one or more non-volatile storage media 830). The processor 810 may control writing data to and reading data from the memory 820 and the non-volatile storage device 830 in any suitable manner, as the aspects of the present invention described herein are not limited in this respect. To perform any of the functionality described herein, the processor 810 may execute one or more instructions stored in one or more computer-readable storage media (e.g., the memory 820), which may serve as non-transitory computer-readable storage media storing instructions for execution by the processor 810.

It should be appreciated that client computer 800 is not limited by any particular type of computer and may include, but is not limited to, a handheld computer, a laptop computer, a tablet computer, a desktop computer, a smartphone, and any other type of computing device capable of rendering a web application in a web browser.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one non-transitory computer-readable storage medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as “first,” “second,” “third,” etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of “including,” “comprising,” “having,” “containing”, “involving”, and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of enabling voice interaction for invoking at least one capability of a web application including at least one web page rendered by a web browser, the method comprising:

detecting, by an agent associated with the web browser, a first document object model event;

analyzing, in response to detecting the first document object model event, a document object model of the at least one web page to identify one or more items in the document object model at a first point in time;

determining based, at least in part, on the identified one or more items, that the at least one web page comprises the at least one capability at the first point in time;

enabling voice input to invoke the at least one capability of the web application in response to the identifying that the at least one web page comprises the at least one capability at the first point in time, wherein enabling voice input comprises updating at least one grammar associated with a speech engine based, at least in part, on the one or more items identified in the document object model at the first point in time;

detecting, by the agent, a second document object model event indicating that a context of the web application has changed since the first point in time;

analyzing, in response to detecting the second document object model event, the document object model of the at least one web page to identify at least one new item in the document object model at a second point in time; and updating the at least one grammar based, at least in part, on the at least one new item identified in the document object model at the second point in time.

2. The method of claim 1, wherein enabling voice input comprises instructing a voice application to recognize voice commands corresponding to the at least one capability.

3. The method of claim 2, further comprising:

receiving information from the voice application indicating that a user has spoken a voice command corresponding to the at least one capability; and performing at least one action in response to receiving the information from the voice application, wherein the at least one action is specified in a data structure accessible to an agent executing in the web browser.

4. The method of claim 1, wherein determining that the at least one web page comprises the at least one capability comprises determining whether the at least one web page includes a particular user interface element.

5. A non-transitory computer-readable storage medium encoded with a plurality of instructions that, when executed by a computer, performs a method of enabling voice interaction for invoking at least one capability of a web application including at least one web page rendered by a web browser, the method comprising:

detecting, by an agent associated with the web browser, a first document object model event;

analyzing, in response to detecting the first document object model event, a document object model of the at least one web page to identify one or more items in the document object model at a first point in time;

determining based, at least in part, on the identified one or more items, that the at least one web page comprises the at least one capability at the first point in time;

enabling voice input to invoke the at least one capability of the web application in response to the identifying that the at least one web page comprises the at least one capability at the first point in time, wherein enabling voice input comprises updating at least one grammar associated with a speech engine based, at least in part, on the one or more items identified in the document object model at the first point in time;

detecting, by the agent, a second document object model event indicating that a context of the web application has changed since the first point in time;

analyzing, in response to detecting the second document object model event, the document object model of the at least one web page to identify at least one new item in the document object model at a second point in time; and updating the at least one grammar based, at least in part, on the at least one new item identified in the document object model at the second point in time.

6. The computer-readable storage medium of claim 5, wherein enabling voice input comprises instructing a voice application to recognize voice commands corresponding to the at least one capability.

7. The computer-readable storage medium of claim 6, wherein the method further comprises:

receiving information from the voice application indicating that a user has spoken a voice command corresponding to the at least one capability; and performing at least one action in response to receiving the information from the voice application, wherein the at least one action is specified in a data structure accessible to an agent executing in the web browser.

8. The computer-readable storage medium of claim 5, wherein determining that the at least one web page comprises the at least one capability comprises determining whether the at least one web page includes a particular user interface element.

9. A computer, comprising:

at least one processor programmed to:

detect a first document object model event;

analyze, in response to detecting the first document object model event, a document object model of the at least one web page to identify one or more items in the document object model at a first point in time;

determine based, at least in part, on the identified one or more items, that the at least one web page comprises the at least one capability at the first point in time enable voice input to invoke the at least one capability of the web application in response to the identifying that the at least one web page comprises the at least one capability at the first point in time, wherein enabling voice input comprises updating at least one grammar associated with a speech engine based, at least in part, on the one or more items identified in the document object model at the first point in time;

detect a second document object model event indicating that a context of the web application has changed since the first point in time;

analyze, in response to detecting the second document object model event, the document object model of the at least one web page to identify at least one new item in the document object model at a second point in time; and update the at least one grammar based, at least in part, on the at least one new item identified in the document object model at the second point in time.

10. The computer of claim 9, wherein enabling voice input comprises instructing a voice application to recognize voice commands corresponding to the at least one capability.

11. The computer of claim 10, wherein the at least one processor is further programmed to:

receive information from the voice application indicating that a user has spoken a voice command corresponding to the at least one capability; and perform at least one action in response to receiving the information from the voice application, wherein the at least one action is specified in a data structure accessible to an agent executing in the web browser.

* * * * *